UNITED STATES PATENT OFFICE.

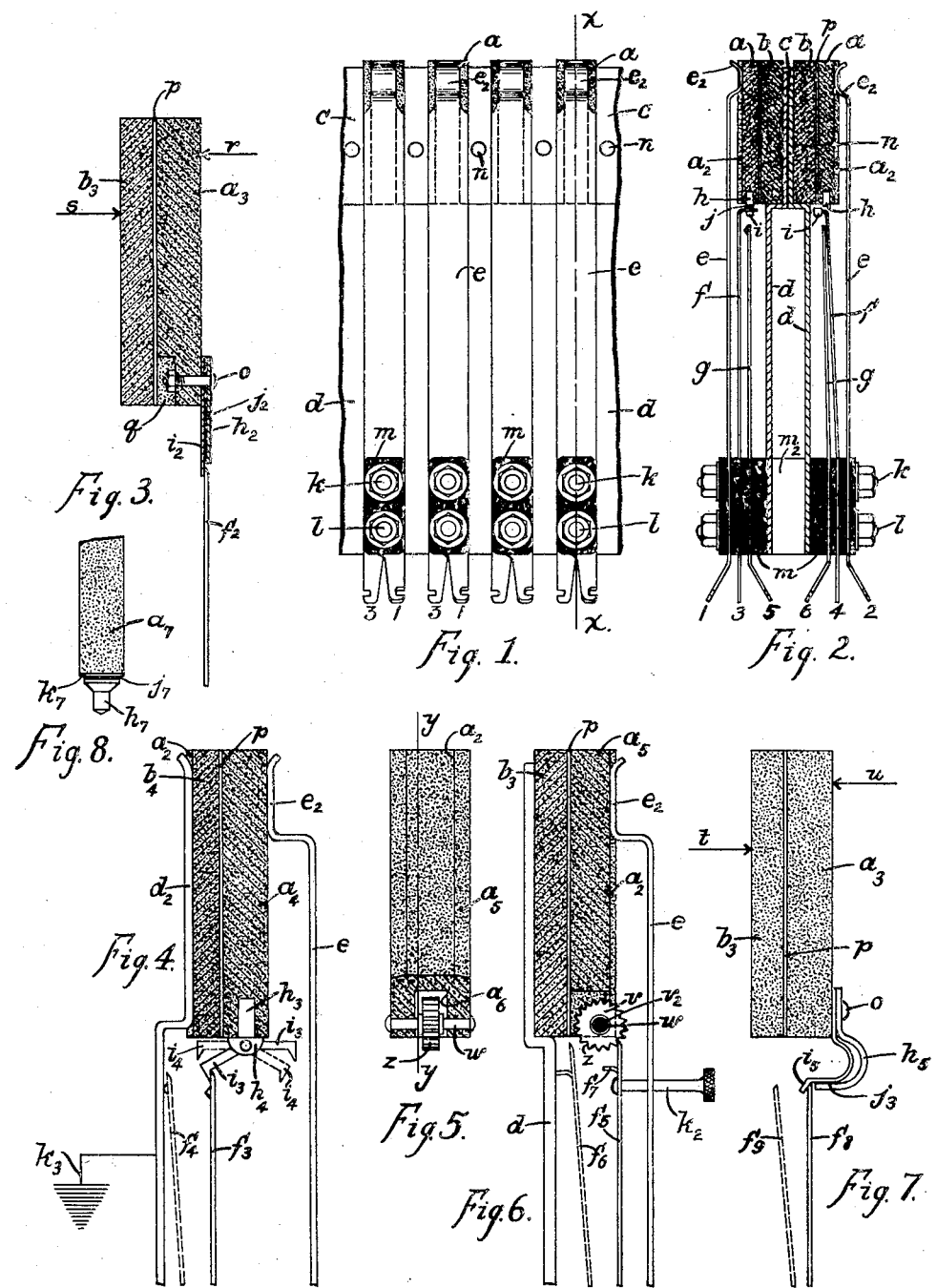

FREDERICK R. PARKER, OF CHICAGO, ILLINOIS.

COMBINED LIGHTNING-ARRESTER AND THERMAL PROTECTOR.

1,238,728.  Specification of Letters Patent.  Patented Aug. 28, 1917.

Application filed August 20, 1904, Serial No. 221,519. Renewed January 19, 1917. Serial No. 143,414.

*To all whom it may concern:*

Be it known that I, FREDERICK R. PARKER, a citizen of the United States of America, residing at Chicago, in the county of Cook and State of Illinois, have invented new and useful Combined Lightning-Arresters and Thermal Protectors, of which the following is a specification, reference being had to the accompanying drawings, illustrating same.

My invention relates to high-potential electricity arresters and electro-thermal devices.

The principal objects of my invention are, to provide an improved device embodying both a high-potential electricity arrester and a thermally-operable device; to adapt such a device for use under various conditions and requirements; to provide improved means in a high-potential electricity arrester for switching a circuit upon abnormal electrical conditions in the arrester; to adapt an electrode of the arrester as heating means for an electro-thermal device; and to provide simplicity and efficiency in such apparatus. Other objects will be apparent from the following specification.

In protective apparatus for electrical circuits and apparatus, such, for example, as the apparatus of telephone systems, or other circuits or systems, it is the usual practice to employ high-potential electricity arresters to protect the said electrical circuits and apparatus from high-voltage currents or charges of electricity, such as lightning, and electro-thermal devices to protect the said circuits and apparatus from "sneak currents," that is, from currents of electricity slightly in excess of the normal, which currents, in time, may burn out certain parts of the apparatus, due to a gradual heating. Heretofore there has been employed a certain class of devices for the high-potential electricity arresters and a distinctly different and separate class of devices for the electro-thermal protectors.

In my present invention I combine both of the above-mentioned classes of devices into a single device which embodies both a high-potential electricity arrester and an electro-thermal device, and which serves all the purposes of both. Thus I provide a single device which has a small number of parts, to take the place of the two distinctly different devices, and which, on account of its simplicity, may be very cheaply manufactured and very economically, efficiently and effectively utilized. The advantages of my single device over the two distinctly different devices generally used, are very apparent and will be readily seen from the following detailed description which refers to the accompanying drawings illustrating several forms of my invention.

In this invention I also provide means whereby a high-potential electricity arrester may automatically disrupt a circuit leading thereto and also connect this circuit to earth if desired, by abnormal electrical conditions in the arrester. Either one or both of these purposes may be accomplished, as desired, or the arrester may be adapted to control or switch any desired circuits upon abnormal electrical conditions therein. It will be readily seen that this feature in a high-potential electricity arrester is very advantageous.

In the accompanying drawings illustrating several of the many forms of my invention, Figure 1 is a side elevation of a series of the devices of the invention mounted on a suitable support; Fig. 2 is a cross-section of Fig. 1, taken on line $x$—$x$, with portions shown in elevation, showing a pair of the devices of the invention mounted on opposite sides of a supporting plate; Figs. 3, 4 and 6 are cross-sections of modified forms of the device, taken the same as Fig. 2, with certain portions removed and other portions shown in elevation; Fig. 5 is a side view of Fig. 6, with portions removed, Fig. 6 being taken on line $y$—$y$ of Fig. 5; Fig. 7 is an edge view of still another modified form of the invention, with certain portions removed; and Fig. 8 shows a method of securing a pin to a heat-producing member.

Like characters refer to like parts in the several figures.

In Figs. 1 and 2, the metal strips $d$ $d$ are preferably secured together at one edge $c$, by rivets $n$ $n$, thus forming a support for the protective devices, and are spaced at a given distance from each other over the remainder of the strips $d$ $d$, by a distance piece $m_2$. This plate $d$ $d$ thus formed, is preferably grounded and is preferably of such a length that a number of protective devices may be mounted on either side thereof. It is not essential to form the ground plate as described, as any suitable plate or support, as a part of the iron work of a distributing board, a protector rack, a cable head, or the like, may be used instead. As the apparatus mounted on opposite sides of plate $d\,d$ is in duplicate sets, I will describe in detail that on one side only.

Spring members $e$, $f$ and $g$, are mounted flatwise on plate $d\,d$ by bolts $k$ and $l$, and are insulated from each other and from the plates $d\,d$ by suitable insulating bushings and washers $m$. The protective device proper, comprising conducting members $a$ and $b$ held adjacent to each other but insulated from one another by a thin dielectric $p$, is removably inserted between the free end of spring $e$ and the tongue portion $c$ of plate $d\,d$, the conducting member $b$ being placed against strip $d$ between two rivets or pins $n\,n$ which hold $b$ in place on $d$. The conducting members $a$ and $b$ are preferably of carbon or graphite, but may be of any other suitable material. Spring $e$ is preferably provided with a narrow portion $e_2$ at its free end adapted to fit in a groove $a_2$ in block $a$ to hold same in place. It will be noticed that spring $e$ does not engage the member $a$ along its entire length as in the usual lightning arrester; it simply engages the member $a$ for a short distance near one end thereof, so as to allow the conductive circuit through $a$ to extend nearly the full length of the latter. This is done to get the proper heating effect in the thermal protector. A pin $h$ of conducting material is preferably inserted into a hole in one end of block $a$ so as to be firmly held there. A conductive portion $i$ is preferably secured to $h$ by a heat-susceptible material $j$, preferably a solder with a low melting point. Spring $f$ is provided with a forked portion at its free end adapted to firmly grasp the portion $i$ of the pin. The tension in springs $e$ and $f$ is toward the plate $d\,d$. Spring $g$ is an alarm spring. In a telephone system, or the like, the line conductors are connected to terminals 3 and 4, the switchboard conductors to terminals 1 and 2, and the alarm circuit conductors to terminals 5 and 6. The pin $i\,j\,h$ may be of one piece of solder if desired, instead of two conductive portions soldered together. The conductive circuit, or thermal protector circuit, through the device, is from switchboard terminal 1, through spring $e$, portion $e_2$ of spring $e$, heat-producing member $a$, pin $h\,j\,i$, and spring $f$, to line terminal 3. The lightning arrester circuit through the device is from line terminal 3, through spring $f$, pin $i\,j\,h$, conducting member $a$, dielectric $p$, conducting member $b$, and ground plate $d\,d$ to ground. The alarm circuit is preferably connected from terminal 5 (or 6) to ground plate $d\,d$.

When a high-potential current or charge of electricity, such as lightning, comes in over the line spring $f$, it passes through spring $f$, pin $i\,j\,h$, conducting member $a$, arcs through the dielectric $p$ to conducting member $b$, and then passes through plate $d\,d$ to ground, thus protecting the switchboard circuit and apparatus connected to connection terminal 1 (or 2) from the high voltage charge or current.

When a "sneak current," that is, a current slightly in excess of the normal, or a larger current, traverses the resistance material $a$ for a short length of time, or, in fact, when a persistent electric discharge passes through the lightning arrester, it heats the resistance material $a$, due to the resistance of the element $a$ in the case of a sneak current and to the heat of the adjacent arc in the case of a continued discharge through the arrester, and when the heat is sufficient it softens the heat-susceptible material $j$ and thereby allows spring $f$ to separate the portion $i$ of the engaging pin from the portion $h$, and the spring $f$ to come in contact with the ground strip $d$, as shown upon the right of Fig. 2, thus opening the circuit between the line and switchboard springs $f$ and $e$, respectively, and also through the heat-producing member $a$, and grounding the line spring $f$. In the type of device illustrated in Fig. 2, the heat of the discharge or arc in the lightning arrester is conducted to the heat-susceptible material $j$ through the member $a$ and the pin $h$; but I do not wish to limit myself to this particular construction for this purpose. Thus it will be seen that the various objectionable currents in spring $f$ are switched from the switchboard spring $e$ and the apparatus connected thereto, to ground, the said apparatus being thus protected from the harmful heating effects. In case of a continued arc through the arrester, occasioned by a cross between the line and a high-voltage circuit, or the like, the same will be stopped by the spring $f$ coming in contact with the plate $d$, due to the arc heating the element $a$ and thus softening the heat-susceptible material $j$, and hence the dangers occasioned by such an arc will be eliminated. When spring $f$ thus operates, it also engages spring $g$ and thereby closes an alarm circuit between spring $g$ and ground plate $d\,d$. In restoring the device to operative condition, the portion comprising block $a$ and pin $h\,j\,i$ may be replaced by a similar new portion and spring $f$ may then be engaged with the new pin as originally. When the pin $h\,j\,i$ is made of one piece of fusible material, the heat produced in $a$ simply weakens the pin and allows spring $f$ to pull it apart or bend it out of the way.

In Fig. 3 I preferably secure spring $i_2$, fusible material $j_2$ and conducting member $h_2$, to the heat-producing member $a_3$ by a suitable bolt $o$. In this device the heat from $a_3$ softens the heat-susceptible material $j_2$ which normally secures $i_2$ to $h_2$, and thereby allows spring $f_2$ to move $i_2$ away from $h_2$ until $f_2$ is released from $i_2$, after which spring $i_2$ comes back in place against $h_2$ and is again secured thereto by the fusible material $j_2$ becoming cool. When the apparatus is reset, the spring $f_2$ is engaged with spring $i_2$ as originally. The device may be operated and reset again and again, as just described, as many times as desired. The switchboard spring bears against $a_3$ at $r$ and the ground plate bears against the conducting member $b_3$ at $s$.

In Fig. 4 I have provided the heat-producing member $a_4$ with an oscillating lever $i_3$ pivoted to ears $h_4$ of pin $h_3$ which is rigidly secured within a hole in $a_4$. The lever $i_3$ is soldered between ears $h_4$ by an easily fusible solder. The heat produced in $a_4$ by an abnormally large current therein, is conducted to the heat-susceptible material between $i_3$ and $h_4$, which becomes softened thereby and thus allows spring $f_3$ to move the lever $i_3$ to the position $i_4$ shown in dotted lines, spring $f_3$ at the same time being released from $i_3$ and taking the position $f_4$ in contact with ground plate $d_2$. When the solder cools, the lever $i_3$ is soldered to ears $h_4$ in the new position $i_4$. When the apparatus is reset, the block $a_4$ is removed and turned half way around so as to bring the other end of lever $i_3$ in an engaging position for spring $f_3$, and then is inserted in place, the spring $f_3$ being now engaged with the said other end of lever $i_3$ in the same position as originally. The device may be operated over again and again, each time the block $a_4$ and lever $i_3$ being turned half way around to a new operative position. The conducting member $b_4$ may be grooved as at $a_2$ to accommodate the portion $d_2$. $k_3$ is a ground connection.

In Figs. 5 and 6 I have provided the heat-producing member $a_5$ with a toothed wheel $v$ preferably secured on an axis $w$ by heat-susceptible material $v_2$, the axis $w$ being preferably rigidly secured to the member $a_5$. It is not essential to solder the wheel $v$ to the axis $w$, as $v$ and $w$ may be one and the same piece, in which case the axis $w$ would be held to the block $a_5$ by heat-susceptible material. The block $a_5$ is preferably cut away as at $a_6$ to accommodate the wheel $v$. Spring $f_5$ normally engages a tooth $z$ of wheel $v$ and tends to turn the latter upon its support. When an abnormally large current traverses the resistance material $a_5$ for a short length of time, the heat produced therein is conducted to the heat-susceptible material $v_2$ which becomes softened and thereby allows spring $f_5$ to turn wheel $v$ upon its support until spring $f_5$ is released from wheel $v$ and takes the position $f_6$, the contact portion $f_7$ of spring $f_5$ coming in contact with the ground plate $d$. Thus the circuit through the resistance material $a_5$ is broken, and when the heat-susceptible material cools, the wheel $v$ is again secured in an operative position on its axis. When the device is reset, the spring $f_5$ is again engaged with a tooth $z$ of wheel $v$ as originally. The device may be operated and reset, as just described, as many times as desired. I may also provide a handle portion $k_2$, preferably of insulating material, by which spring $f_5$ may be reset to operative position, and which may also serve as an indicator to indicate whether the spring $f_5$ has operated or not.

In Fig. 7 I have shown a modification of the device of Fig. 3, in which spring $i_5$ is normally soldered to member $h_5$ by heat-susceptible material $j_3$ which may be either a metallic solder or an insulating wax. When the device operates, spring $f_8$ separates $i_5$ from $h_5$ until it is released from $i_5$ and takes the position $f_9$, after which spring $i_5$ returns to $h_5$ and is again secured thereto by the heat-susceptible material $j_3$ becoming cool. The device may be operated again and again as often as desired. The switchboard spring may engage the block $a_3$ at $u$, and the ground plate may engage the block $b_3$ at $t$.

In Fig. 8 I preferably cover the end of the resistance material $a_7$ with a metallic plating $k_7$ and solder the pin $h_7$ to the plating $k_7$ by heat-susceptible material $j_7$. This pin $h_7$ takes the place of pin $h j i$ of Fig. 2. A metallic plating may also be provided on other portions of the surfaces of the conducting blocks of this invention, when required, preferably where contact portions rest.

The devices of this invention are also provided with means for testing the different circuits through same. In Figs. 1 and 2, contact members of a testing plug may be inserted between the conducting member $a$ and portion $e_2$ of spring $e$, on either side or both sides of the mounting strip $c$, to open the respective contacts between springs $e$ $e$ and their conducting members $a$ $a$ and thereby allow the different circuits (the line and switch-board circuits) to be tested. In Fig. 4, contact members of a testing plug may be inserted between spring $e_2$ and conducting member $a_4$, and between ground plate or spring $d_2$ and conducting member $b_4$, to open the respective contacts and thereby allow the switchboard circuit, the line circuit, and the protective device, to be tested independently of each other. Suitable testing arrangements may be provided for all of the different forms of my invention.

While I have shown and described only a few forms of a combined lightning arrester and thermal protector, there are many other forms and modifications which could be readily made, and I therefore do not wish to limit this present invention to the particular types of such a device, as are herein shown. Neither do I wish to limit myself to the exact details of construction as herein shown, nor to the particular arrangement of my device in connection with protective apparatus. I desire it to be understood that the device of this invention may be adapted for use on various circuits and under various conditions. The principles involved are what I particularly hereinafter claim, and therefore, minor details in the construction would not be a departure from the scope of the invention.

The conducting members, and especially the heat-producing member, of the device, may be proportioned and shaped in any desired manner to fulfil the requirements.

While I have mentioned an abnormally large current as producing the heat for operating the thermal protector, in several places in the specification, I wish it to be understood that the heat for operating the device may be produced by electricity in various forms, as, for example, a continuous direct current, an alternating, pulsating, or intermittent current, an arc through the arrester, either a continued arc or a strong arc of short duration, a steady flow of current through the lightning arrester, or, in fact, any form of current or discharge through the device.

One form of the protector illustrated in Fig. 2, forms the subject matter of my co-pending United States patent application Serial No. 841,728, filed May 29, 1914, on electrical protective apparatus, which is a division of this present application. The protector illustrated in Fig. 4, forms the subject matter of my co-pending United States patent application Serial No. 181,242, filed July 18, 1917, on electrical protector, which is a division of this present application.

Having thus described my invention, what I claim is:

1. An electrode of a spark-gap electricity arrester arranged as a resistance heater for an electrothermal device having separate thermally-releasable retaining means, and adapted by virtue of its resistance to produce sufficient heat for operating the said device.

2. A spark-gap electricity arrester having a carbonaceous electrode included in series in a line circuit, and thermally-operable mechanism coöperating therewith whereby the line circuit is controlled or changed upon excessive heating.

3. A carbonaceous body adapted and arranged as an electrode of a spark-gap electricity arrester and also as a resistance heater for an electrothermal device, the said body being adapted by virtue of its resistance to produce sufficient heat for operating the said device.

4. In electrothermal apparatus having switching mechanism and heat-susceptible means for normally holding the said switching mechanism under control, a separate resistance heater member associated with the heat-susceptible means and adapted by virtue of its resistance to sufficiently heat the heat-susceptible means to cause the operation of the apparatus, in combination with spark-gap electricity arrester equipment, the said heater member providing an electrode for the arrester.

5. In electrothermal apparatus having switching mechanism and heat-susceptible means for normally holding the said switching mechanism under control, a separate resistance heater associated with the heat-susceptible means and adapted by virtue of its resistance to sufficiently heat the heat-susceptible means to cause the operation of the apparatus, in combination with equipment providing a spark-gap for arresting high-potential electricity, said spark-gap being thermo-conductively related to said apparatus whereby an excessive discharge thereacross causes the operation of said apparatus.

6. In electrical protective apparatus, the combination of a metallic ground plate, conducting members insulatively mounted onto the said ground plate and adapted for receiving and holding removable protective devices, thermally-controlled switching mechanism, a resistance heater for heating and causing the operation of the said switching mechanism, and an electrode of a spark-gap electricity arrester positioned in close proximity to the said heater and removable from the protective apparatus and replaceable therein with the said heater as a unitary device.

7. In electrical protective apparatus, the combination of a metallic ground plate, conducting members insulatively mounted onto the said ground plate and adapted for receiving and holding removable protective devices, and a unitary protective device embodying a resistance heater for heating and causing the operation of thermally-controlled switching mechanism associated therewith, and a spark-gap electricity arrester, the said unitary device, embodying the said heater and arrester, coöperating with the said apparatus and being removable therefrom and replaceable therein as such a unitary device.

8. Electrothermal apparatus having switching mechanism, heat-susceptible means for normally holding the said switching mechanism under control, and a separate resistance heater member associated with the heat-susceptible means and adapted by virtue of its resistance to sufficiently heat the heat-susceptible means to cause the operation of the apparatus, and an electrode of a spark-gap electricity arrester held in place by the said resistance heater member.

9. An electrothermal device comprising switching mechanism, heat-susceptible means normally holding the said switching mechanism against operation, and a separate resistance heater associated with the heat-susceptible means and adapted by virtue of its resistance to sufficiently heat the heat-susceptible means to cause the operation of the device, in combination with equipment providing a spark-gap for arresting high-potential electricity, the said spark-gap being thermo-conductively related to the said device whereby an excessive discharge thereacross causes the operation of the said device.

10. The combination with electrical protective apparatus comprising a ground plate and sets of spring members mounted upon the ground plate and adapted to receive protective devices, of a unitary protective device for each set of spring members, comprising in its construction a high-potential electricity arrester and a resistance heater adapted to be removed from the said spring members or replaced therein as a unit, each said device having thermo-responsive mechanism under its control.

11. In apparatus of the character set forth, a high-potential electricity arrester comprising electrodes normally held in close proximity to each other, one of which embodies a resistance heater which is heated by an arc in the arrester, circuit-controlling means, and heat-susceptible material normally holding the circuit-controlling means in circuit with the heater and under control thereof.

12. An electrical protector comprising in its construction a resistance heater and a high-potential electricity arrester, and separate thermo-responsive mechanism, the parts being arranged so that an excessive current in the heater and also an excessive arc in the arrester, acting either separately or together, causes a response of the thermo-responsive mechanism.

As inventor of the foregoing I hereunto subscribe by name in the presence of two subscribing witnesses, this 16th day of August, A. D., 1904.

FREDERICK R. PARKER.

Witnesses:
ROBERT G. PARKER,
FRANK W. McINTYRE.